United States Patent
Goto et al.

(10) Patent No.: US 7,302,190 B2
(45) Date of Patent: Nov. 27, 2007

(54) OPTICAL COMMUNICATION SYSTEM INCLUDING REPLACEABLE ELECTRO-OPTIC AND OPTO-ELECTRIC CONVERTERS

(75) Inventors: Masataka Goto, Tokyo (JP); Kenji Sato, Miyagi (JP)

(73) Assignee: Nec Corporation, Tokyo (JP)

( * ) Notice: Subject to any disclaimer, the term of this patent is extended or adjusted under 35 U.S.C. 154(b) by 912 days.

(21) Appl. No.: 10/156,233

(22) Filed: May 29, 2002

(65) Prior Publication Data

US 2002/0181053 A1 Dec. 5, 2002

(30) Foreign Application Priority Data

May 30, 2001 (JP) .............................. 2001-161538

(51) Int. Cl.
*H04B 10/04* (2006.01)

(52) U.S. Cl. .................... 398/182; 398/183; 398/186; 398/200; 398/201; 398/202; 398/213; 398/214; 398/135; 398/136; 398/137; 398/138; 398/139; 398/141; 398/158; 398/155; 398/162; 398/163; 398/164; 398/1; 398/2; 398/5; 398/7; 398/22; 398/23; 398/24; 398/33

(58) Field of Classification Search ................ 398/136, 398/137, 138, 139, 155, 135, 141, 158, 162, 398/163, 164, 182, 183, 186, 200, 201, 202, 398/213, 214, 22, 23, 24, 33, 1, 2, 5, 7; 385/14, 385/39

See application file for complete search history.

(56) References Cited

U.S. PATENT DOCUMENTS

| | | | | |
|---|---|---|---|---|
| 4,958,341 A | * | 9/1990 | Hemmady et al. | 370/352 |
| 5,172,260 A | * | 12/1992 | Takatsu | 398/155 |
| 5,426,644 A | * | 6/1995 | Fujimoto | 370/535 |
| 5,767,999 A | * | 6/1998 | Kayner | 398/164 |
| 5,825,949 A | * | 10/1998 | Choy et al. | 385/24 |
| 6,356,374 B1 | * | 3/2002 | Farhan | 398/191 |
| 6,704,520 B2 | * | 3/2004 | Goel | 398/182 |
| 7,099,592 B2 | * | 8/2006 | Snawerdt | 398/141 |

FOREIGN PATENT DOCUMENTS

| | | |
|---|---|---|
| JP | 53-074804 | 7/1978 |
| JP | 60-003237 | 1/1985 |
| JP | 08-125636 | 5/1996 |

* cited by examiner

*Primary Examiner*—Hanh Phan
(74) *Attorney, Agent, or Firm*—Foley & Lardner LLP

(57) ABSTRACT

In an optical transmitting or receiving apparatus, a plurality of replaceable electro-optic converters or a plurality of replaceable opto-electric converters are provided in correspondence with optical transmission lines.

11 Claims, 8 Drawing Sheets

OPTICAL COMMUNICATION SYSTEM INCLUDING REPLACEABLE ELECTRO-OPTIC AND OPTO-ELECTRIC CONVERTERS

BACKGROUND OF THE INVENTION

1. Field of the Invention

The present invention relates to an optical communication system including electro-optic converters and opto-electric converters.

2. Description of the Related Art

Generally, an optical communication system is duplex to realize a protection system. That is, a working optical transmission line and a standby optical transmission line are provided for one channel. As a result, when the working optical transmission line fails, the working optical transmission line is switched to the standby optical transmission line, or vice versa.

In prior art duplex optical communication systems, optical cards each including at least one electro-optic converter or opto-electric converter are fixed to a motherboard. This will be explained later in detail.

As a result, when one electro-optic converter (or opto-electric converter) fails, the operation of the entire optical transmitting (or receiving) apparatus has to be stopped, so that the optical card including such a failed converter can be replaced with a new one. This deteriorates the efficiency of the maintenance of the duplex communication system.

SUMMARY OF THE INVENTION

It is an object of the present invention to provide an optical transmitting apparatus, an optical receiving apparatus and an optical communication system capable of improving the efficiency of the maintenance.

According to the present invention, in an optical transmitting or receiving apparatus of an optical communication system, a plurality of replaceable electro-optic converters or a plurality of replaceable opto-electric converters are provided in correspondence with optical transmission lines.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENTS

Before the description of the preferred embodiments, prior art duplex optical communication systems will be explained with reference to FIGS. 1, 2, 3 and 4.

Figure 1:
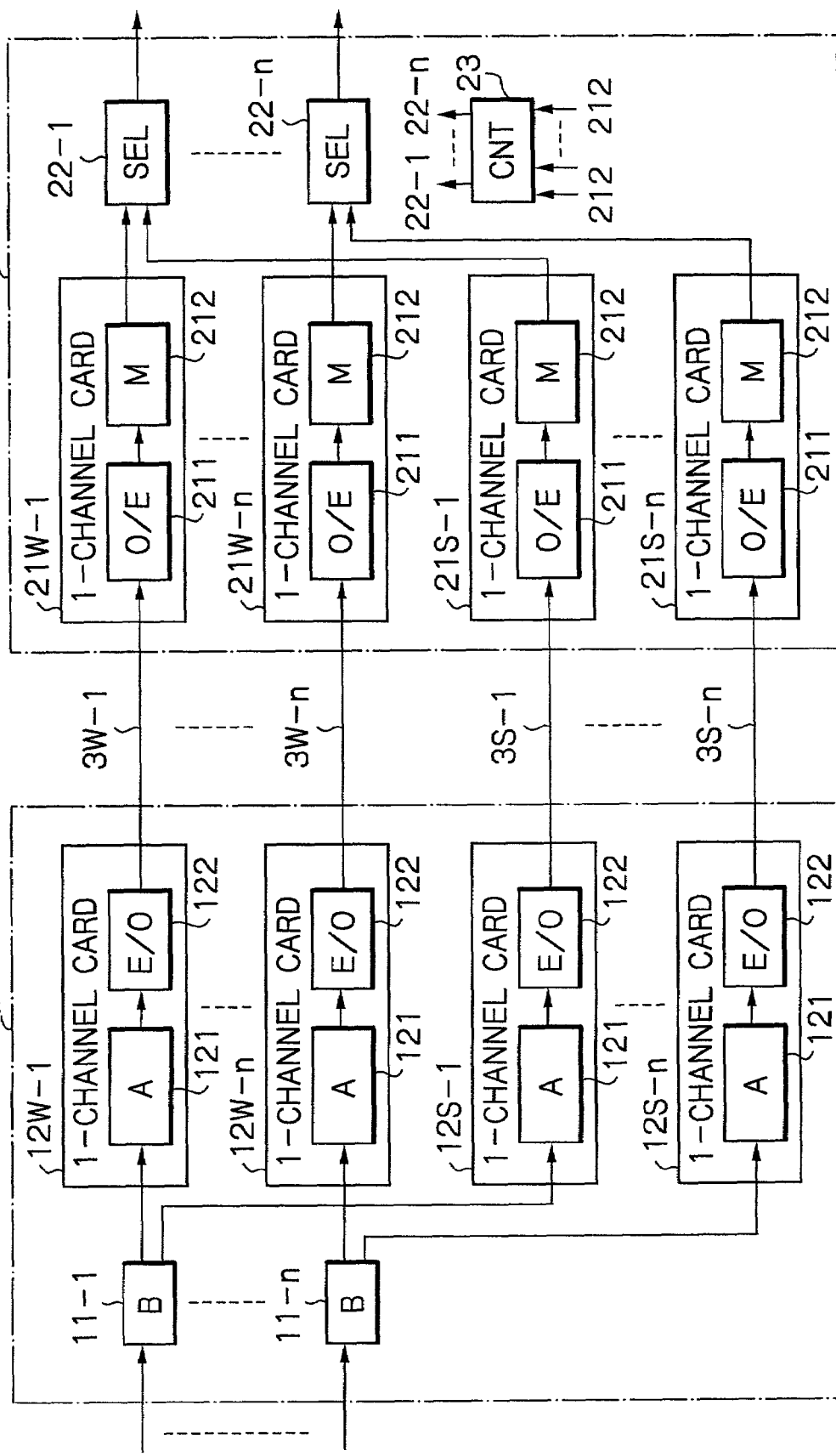
FIG. 1 is a block circuit diagram illustrating a first prior art duplex optical communication system.

In FIG. 1, which illustrates a first prior art duplex optical communication system (see: JP-A-8-125636), an optical transmitting apparatus 1 and an optical receiving apparatus 2 are connected by n-channel working optical transmission lines 3W-1, 3W-2, . . . , 3W-n and n-channel standby transmission lines 3S-1, 3S-2, . . . , 3S-n made of optical fibers.

The optical transmitting apparatus 1 is constructed by 1-channel type branching units 11-1, . . . , 11-n, 1-channel type working optical transmitting cards 12W-1, . . . , 12W-n and 1-channel type standby optical transmitting cards 12S-1, . . . , 12S-n. In this case, the branching unit 11-i (i=1, . . . , n) is connected to the working optical transmitting card 12W-i and the standby optical transmitting card 12S-i. Also, each of the optical transmitting cards 12W-1, . . . , 12W-n, 12S-1, . . . , 12S-n is constructed by a monitoring information adding unit 121 for adding monitoring information such as parity check bits and an electro-optic converter 122.

On the other hand, the optical receiving apparatus 2 is constructed by 1-channel type working optical receiving cards 21W-1, . . . , 21W-n, 1-channel type standby optical receiving cards 21S-1, . . . , 21S-n, selectors 22-1, . . . , 22-n and a control unit 23. In this case, the selector 22-i (i=1, . . . , n) is connected to the working optical receiving card 21W-i and the standby optical receiving card 21S-i. Also, each of the optical receiving cards 21W-1, . . . , 21W-n, 21S-1, . . . , 21S-n is constructed by an opto-electric converter 211 and a transmission path monitoring unit 212 for monitoring the corresponding transmission line by detecting monitoring information thereon. Further, the control unit 23 receives output signals of the transmission path monitoring units 212 of the optical receiving cards 21W-1, . . . , 21W-n, 21S-1, . . . , 21S-n to control the selectors 22-1, . . . , 22-n, so that the selector 22-i (i=1, . . . , n) selects one of the 1-channel type working optical receiving card 21W-i and the 1-channel type standby optical receiving card 21S-i.

In the duplex optical communication system of FIG. 1, when one working system including one 1-channel type working optical transmitting card 12W-i and one 1-channel type standby optical receiving card 21W-i fails, this working system is switched to one standby system including one 1-channel type standby optical transmitting card 12S-i and one 1-channel type standby optical receiving card 21S-i, or vice versa, thus realizing a duplex communication.

Figure 2:
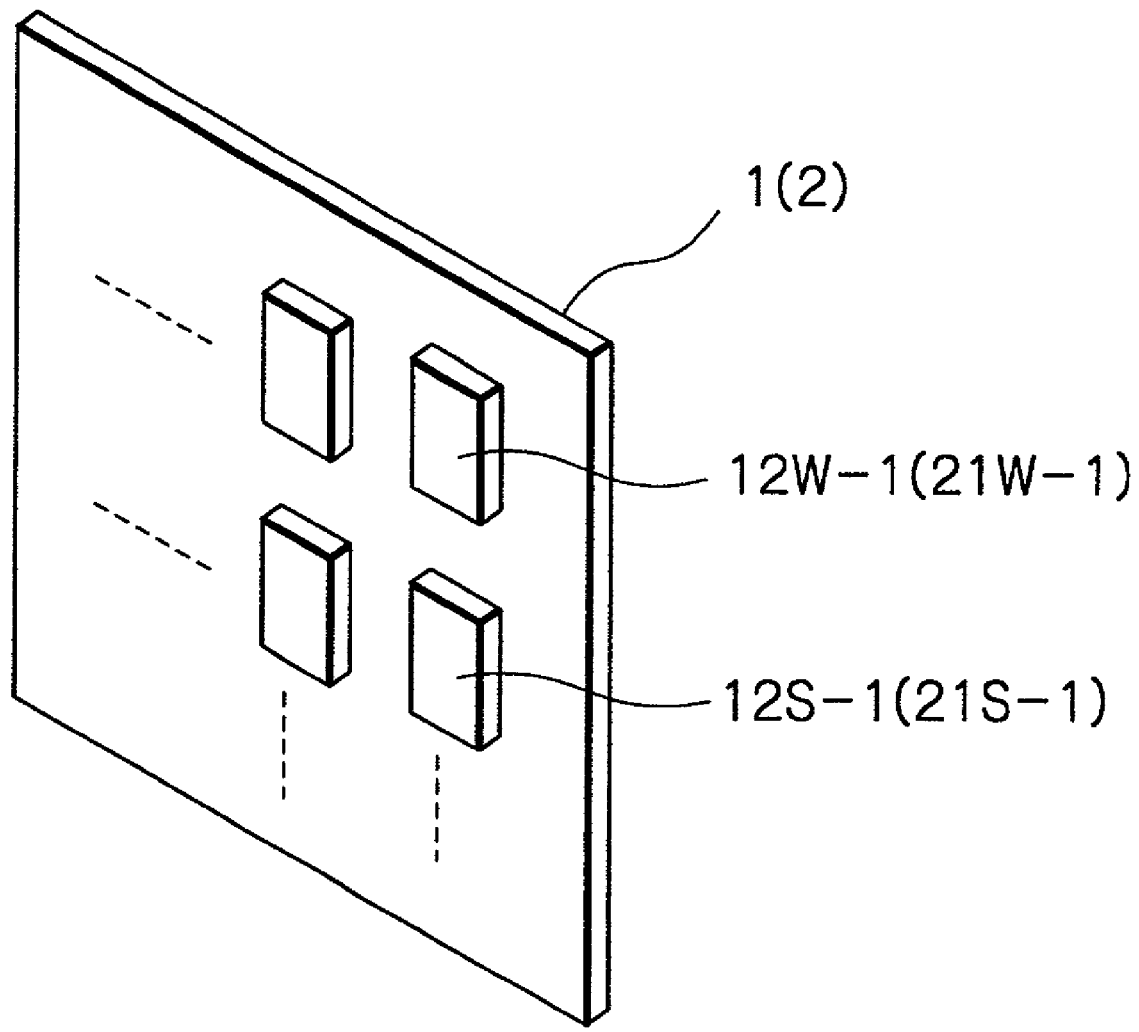
FIG. 2 is a perspective view illustrating the optical transmitting apparatus (the optical receiving apparatus) of FIG. 1.

In the duplex optical communication system of FIG. 1, however, the optical cards 12W-1(21W-1), . . . , 12W-n (21W-n), . . . , 12S-1(21S-1), . . . , 12S-n(21S-n) are fixed to one motherboard for the optical transmitting apparatus 1 (the optical receiving apparatus 2), as illustrated in FIG. 2. As a result, when one of the electro-optic converters 122 (the opto-electric converters 211) fails, the operation of the entire optical transmitting apparatus 1 (the entire optical receiving apparatus 2) has to be stopped, so that the optical card including such a failed converter is replaced with a new one.

This deteriorates the efficiency of the maintenance of the duplex communication system.

Figure 3:
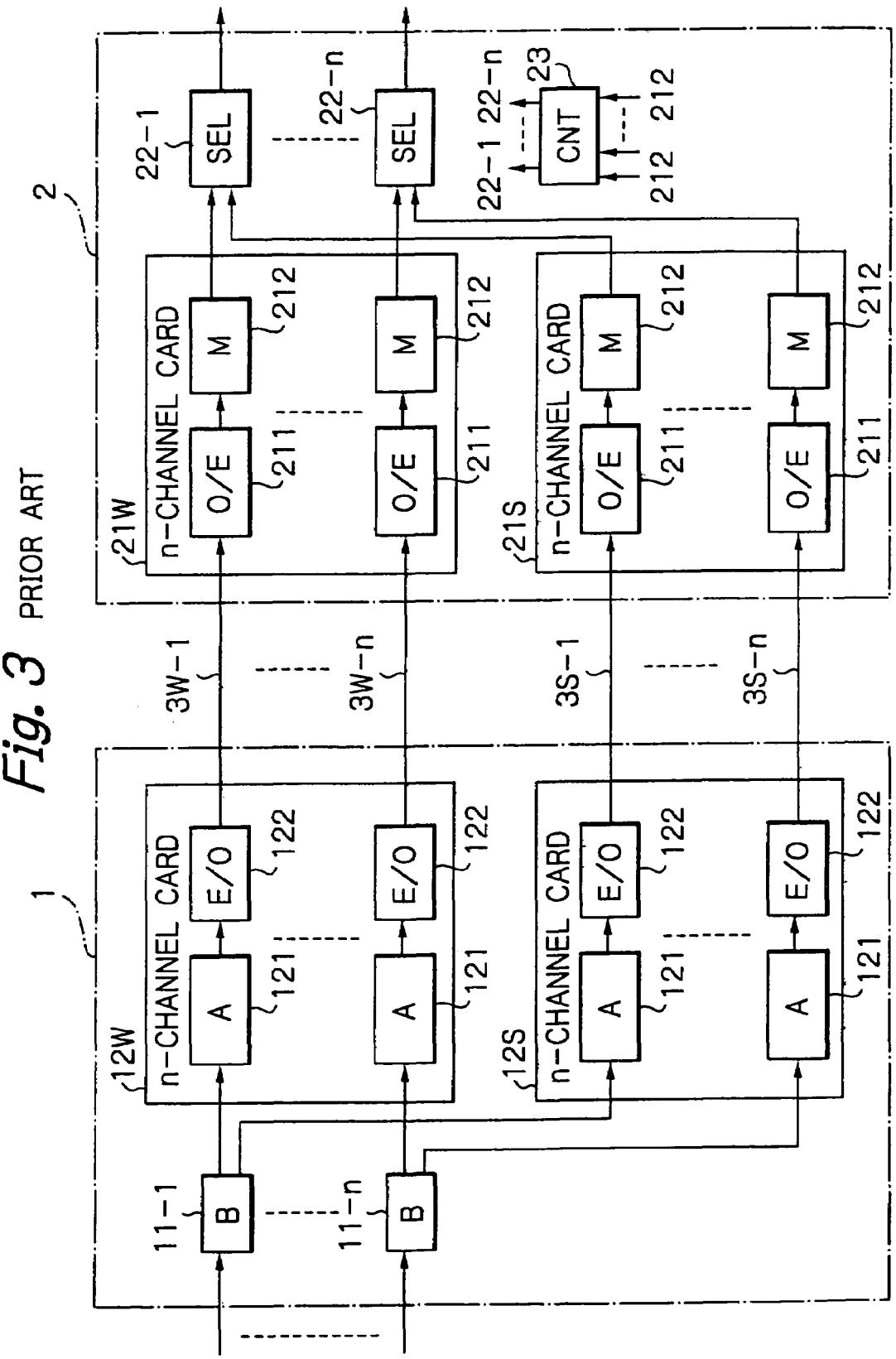
FIG. 3 is a block circuit diagram illustrating a second prior art duplex optical communication system.

In FIG. 3, which illustrates a second prior art duplex optical system, the 1-channel type working optical transmitting cards 12W-1, . . . , 12W-n of FIG. 1 are combined into an n-channel type working optical transmitting card 12W, and the 1-channel type standby optical transmitting cards 12S-1, . . . , 12S-n of FIG. 1 are combined into an n-channel type standby optical transmitting card 12S.

On the other hand, the 1-channel type working optical receiving cards 21W-1, . . . , 21W-n of FIG. 1 are combined into an n-channel type working optical receiving card 21W, and the 1-channel type standby optical receiving cards 21S-1, . . . , 21S-n of FIG. 1 are combined into an n-channel type standby optical receiving card 21S.

As a result, the number of components of the system of FIG. 3 is decreased to decrease the manufacturing cost. Note that the operation of the system of FIG. 3 is the same as that of the system of FIG. 1.

Figure 4:
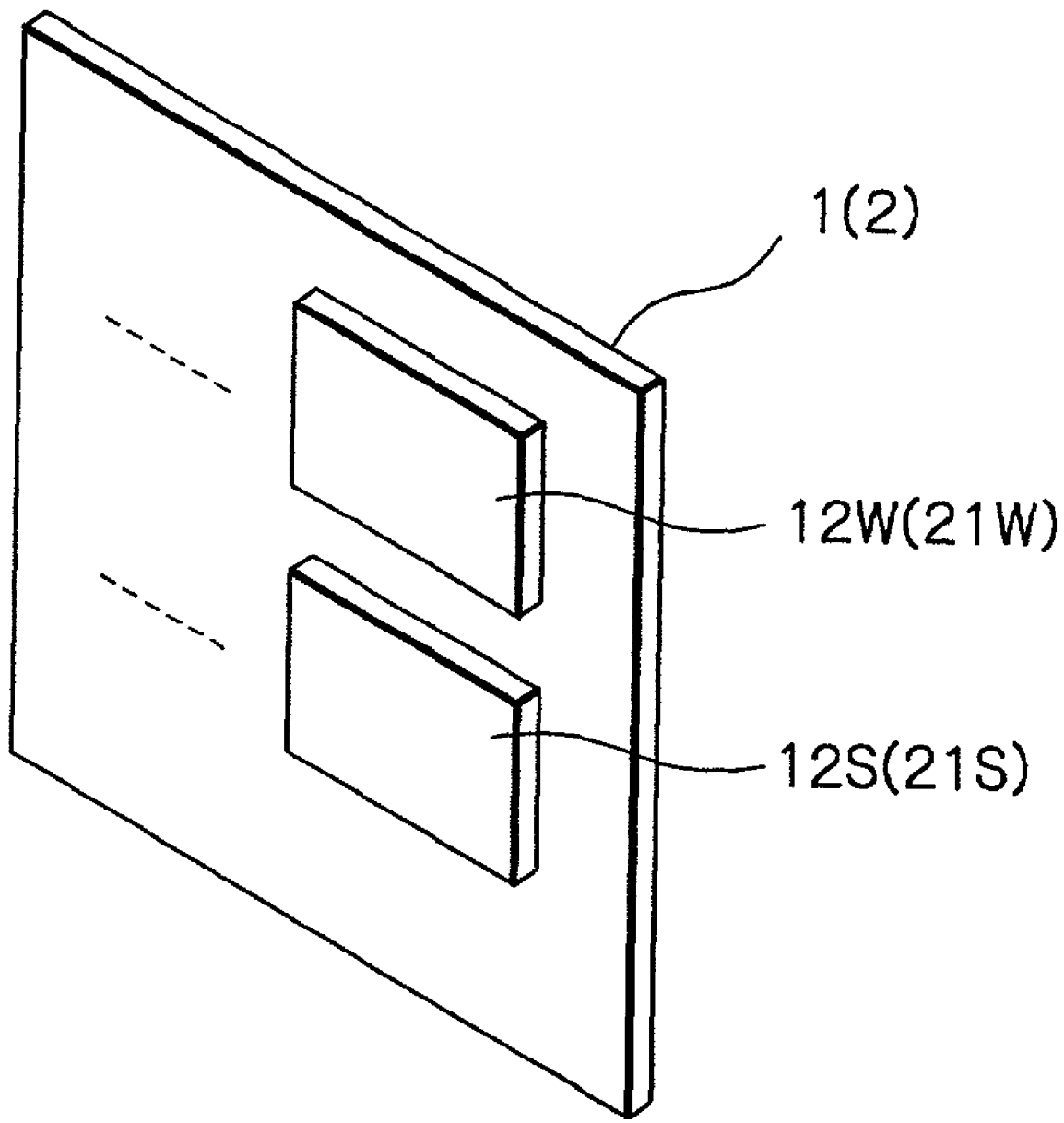
FIG. 4 is a perspective view illustrating the optical transmitting apparatus (the optical receiving apparatus) of FIG. 3.

Even in the duplex optical communication system of FIG. 3, however, the optical cards 12W(21W) and 12S(21S) are fixed to one motherboard for the optical transmitting apparatus 1 (the optical receiving apparatus 2), as illustrated in FIG. 4. As a result, when one of the electro-optic converters 122 (the opto-electric converters 211) fails, the operation of the entire optical transmitting apparatus 1 (the entire optical receiving apparatus 2) has to be stopped, so that the optical card including such a failed converter can be replaced with a new one. This also deteriorates the efficiency of the maintenance of the duplex communication system.

Figure 5:
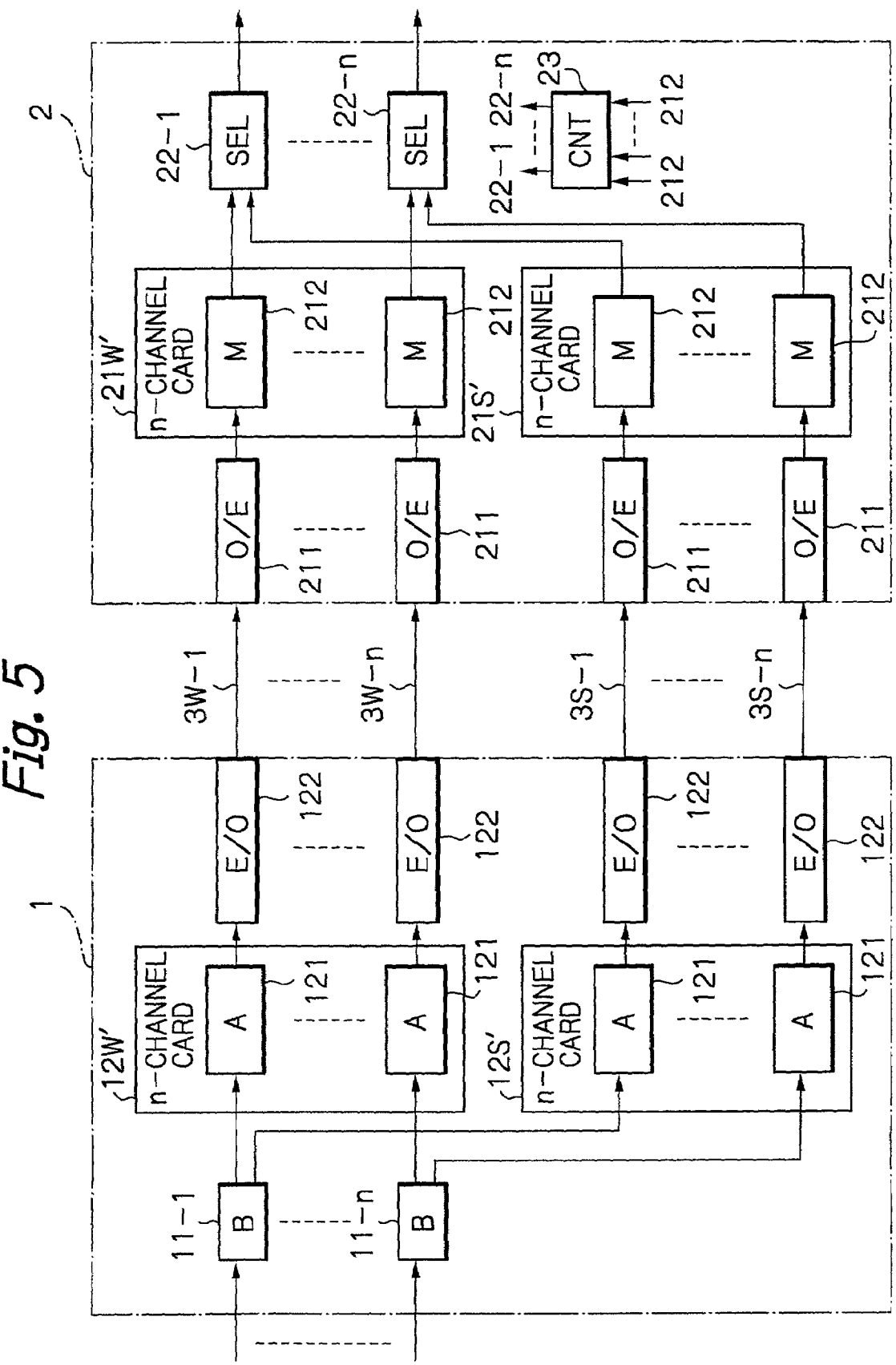
FIG. 5 is a block circuit diagram illustrating a first embodiment of the duplex optical communication system according to the present invention.
Figure 6:
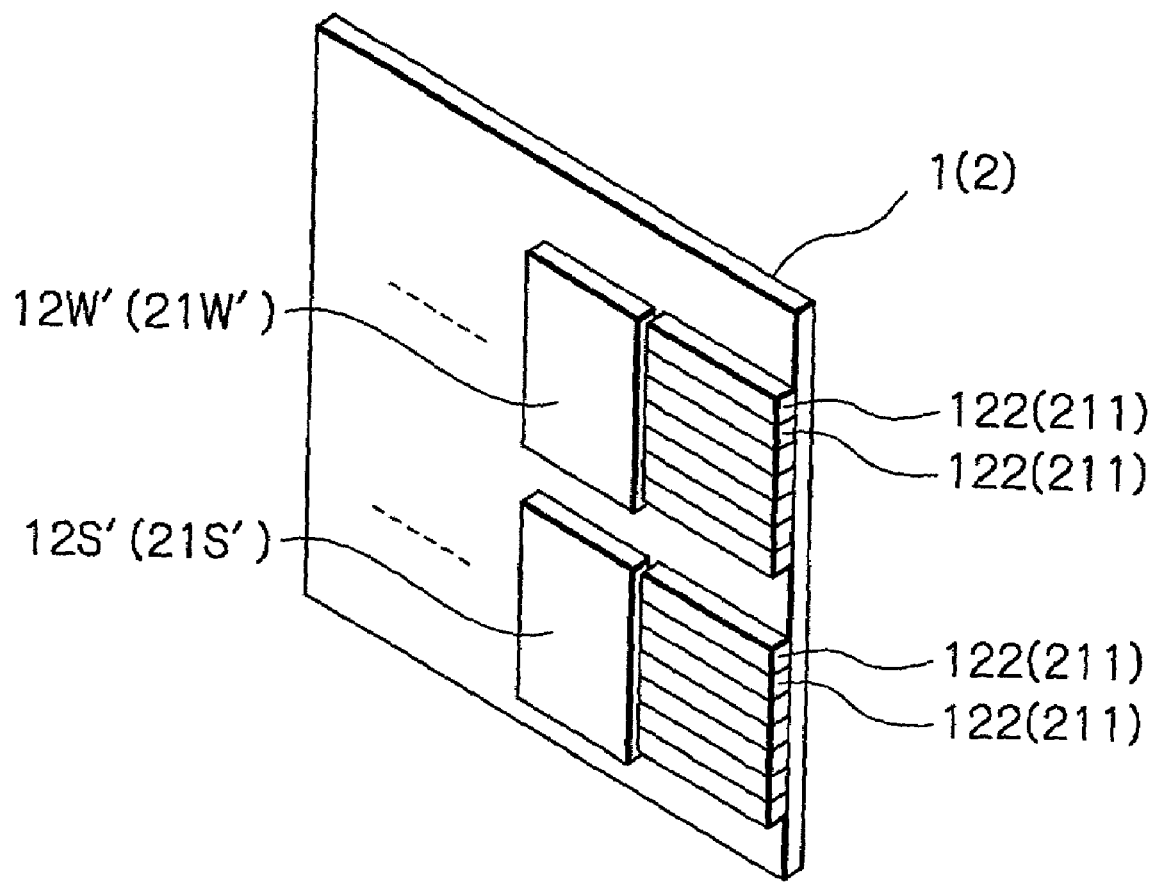
FIG. 6 is a perspective view illustrating the optical transmitting apparatus (the optical receiving apparatus) of FIG. 5.

In FIG. 5, which illustrates a first embodiment of the present invention, the n-channel type working optical transmitting card 12W of FIG. 3 is replaced by an n-channel type working optical transmitting card 12W' which includes only the monitoring information adding units 121, and the n-channel type standby optical transmitting card 12S of FIG. 3 is replaced by an n-channel type standby optical transmitting card 12S' which includes only the monitoring information adding units 121. Each of the electro-optic converters 122 is of a stick type as illustrated in FIG. 6, and accordingly, each of the electro-optic converters 122 is replaceable. In more detail, each of the electro-optic converters 122 is inserted into a slot (not shown) on the optical transmitting apparatus 1.

On the other hand, the n-channel type working optical receiving card 21W of FIG. 3 is replaced by an n-channel type working optical transmitting card 21W' which includes only the transmission line monitoring units 212, and the n-channel type standby receiving optical card 21S of FIG. 3 is replaced by an n-channel type standby optical receiving card 21S' which includes only the transmission line monitoring units 212. Each of the opto-electric converters 211 is of a stick type as illustrated in FIG. 6, and accordingly, each of the opto-electric converters 211 is replaceable. In more detail, each of the opto-electric converters 211 is inserted into a slot (not shown) on the optical receiving apparatus 2.

In the duplex optical communication system of FIGS. 5 and 6, since the electro-optic converters 122 and the opto-electric converters 211 are of a stick type and accordingly, are replaceable, when one of the electro-optic converters 122 (the opto-electric converter 211) fails, such a failed converter is easily replaced with a new one without stopping the operation of the entire optical transmitting apparatus 1 (the entire optical receiving apparatus 2). This improves the efficiency of the maintenance of the duplex communication system.

Figure 7:
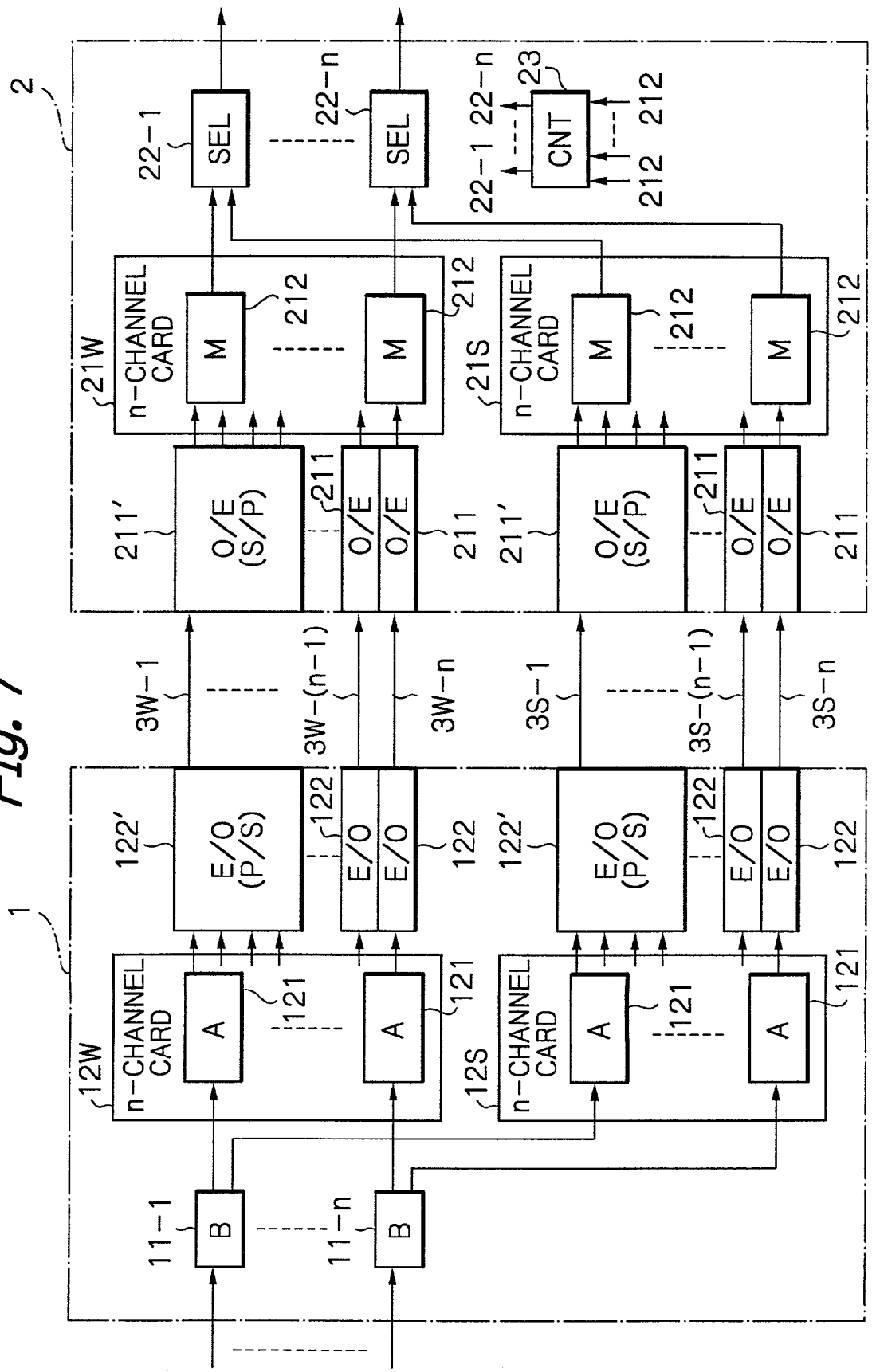
FIG. 7 is a block circuit diagram illustrating a second embodiment of the duplex optical communication system according to the present invention.

In FIG. 7, which illustrates a second embodiment of the present invention, one electro-optic converter 122' including a 4-to-1 parallel-to-serial converter is provided instead of the four electro-optic converters 122 for each of the n-channel type working optical transmitting card 12W and the n-channel type standby optical transmitting card 12S, and one opto-electric converter 211' including a 1-to-4 serial-to-parallel converter is provided instead of the four opto-electric converters 211 for each of the n-channel type working optical receiving card 21W and the n-channel type standby optical receiving card 21S.

Figure 8:
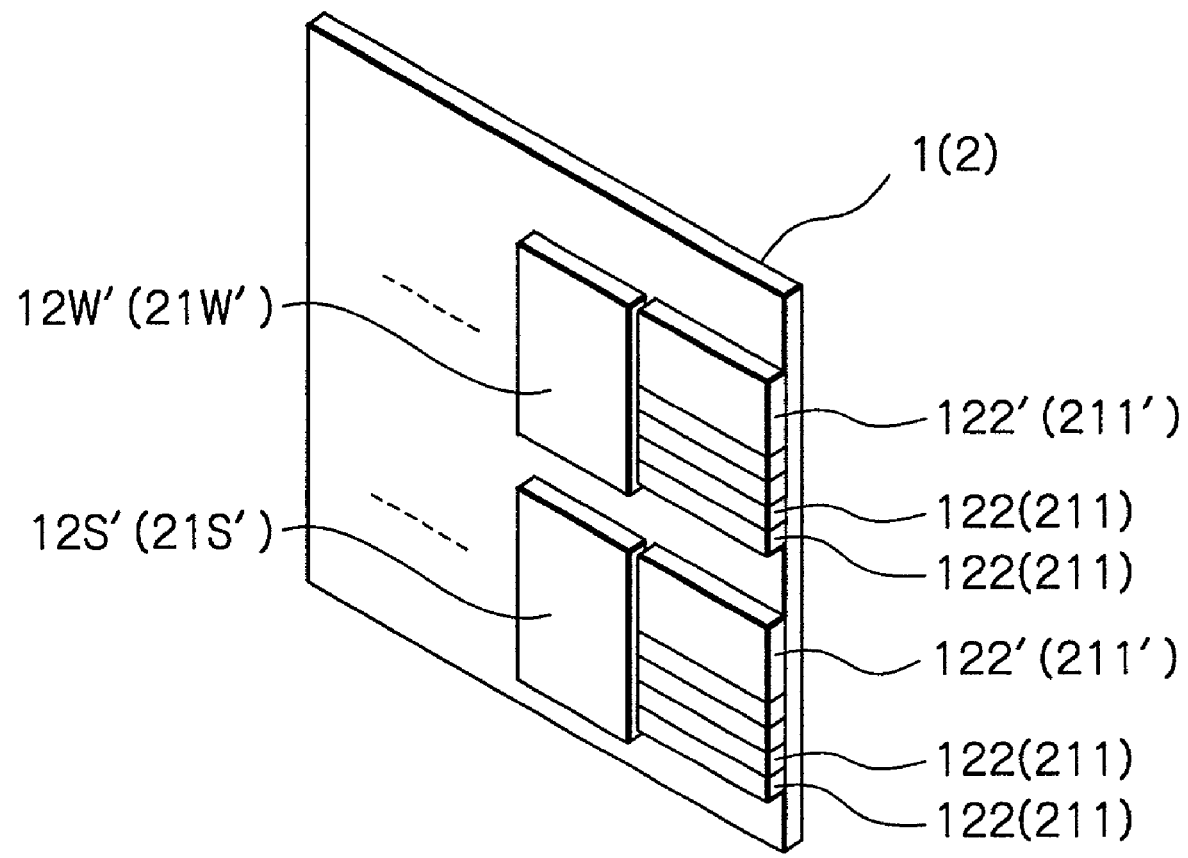
FIG. 8 is a perspective view illustrating the optical transmitting apparatus (the optical receiving apparatus) of FIG. 7.

The electro-optic converter 122' and the opto-electric converter 211' are also of a stick type as illustrated in FIG. 8, and accordingly, the electro-optic converter 122' and the opto-electric converter 211' are replaceable. In more detail, the electro-optic converter 122' is inserted into a slot (not shown) on the optical transmitting apparatus 1, and the opto-electric converter 211' is inserted into a slot (not shown) on the optical receiving apparatus 2.

Note that the size of the electro-optic converter 122' is four times that of the electro-optic converter 122, and the size of the opto-electric converter 211' is four times that of the opto-electric converter 211. Therefore, the motherboard of the optical transmitting apparatus 1 of FIGS. 7 and 8 is the same as that of the optical transmitting apparatus 1 of FIGS. 5 and 6, and the motherboard of the optical receiving apparatus 2 of FIGS. 7 and 8 is the same as that of the optical receiving apparatus 2 of FIGS. 5 and 6.

In the duplex optical communication system of FIGS. 7 and 8, since the electro-optic converter 122' and the opto-electric converter 211' are of a stick type and accordingly, are replaceable, when one of the electro-optic converter 122' (the opto-electric converter 211') fails, such a failed converter is easily replaced with a new one without stopping the operation of the entire optical transmitting apparatus 1 (the entire optical receiving apparatus 2). This improves the efficiency of the maintenance of the duplex communication system.

In the duplex optical communication system of FIGS. 7 and 8, the electro-optic or opto-electric converters use a synchronous digital hierarchy (SDH)/synchronous optical network (SONET). In more detail, each of the converters 122 and 211 is constructed by an optical carrier-level (OC)-3/synchronous transport module (STM)-1, and each of the converter 122' and 211' is constructed by OC-12/STM-4. However, the electro-optic converter 122' can be an electro-optic converter including an N-to-1 parallel-to-serial converter (N=2, 3, 4, . . . ), and the opto-electric converter 211' can be an opto-electric converter including a 1-to-N parallel-to-serial converter (N=2, 3, 4, . . . ).

As explained hereinabove, according to the present invention, since a failed electro-optic or opto-electric converter can be replaced with a new one without stopping the operation of the entire system, the efficiency of the maintenance can be improved.

The invention claimed is:

1. An optical transmitting apparatus comprising a plurality of replaceable electro-optic converters each in correspondence with one optical transmission line, wherein at least one of said replaceable electro-optic converters includes an N-to-1 parallel-to-serial converter, a size of the one of said replaceable electro-optic converters being N-times a size of another replaceable electro-optic converter including no parallel-to-serial converter, wherein the optical transmitting apparatus includes a working optical transmitting component and a stand-by optical transmitting component, wherein said at least one of said replaceable electro-optic converters that includes an N-to-1 parallel-to-serial converter is provided for one of the working optical transmitting component and the stand-by optical transmitting component, and said another replaceable electro-optic converter including no parallel-to-serial converter is provided for the other of the working optical transmitting component and the stand-by optical transmitting component.

2. The optical transmitting apparatus as set forth in claim 1, wherein said replaceable electro-optic converters are of a stick type.

3. optic transmitting apparatus as set forth in claim 1, being duplex.

4. The optical transmitting apparatus as set forth in claim 1, wherein transmission of optical information by way of said optical transmitting apparatus is provided at all times including when one of the working optical transmitting component and a stand-by optical transmitting component is being replaced.

5. The optical transmitting apparatus as set forth in claim 1, further comprising:

a plurality of slots, wherein each of the plurality of replaceable electro-optic converters is connected to a respective one of the plurality of slots of the optical transmitting apparatus, to allow for connection and removal of any one of the plurality of replaceable electro-optic converters without affecting any other of the plurality of replaceable electro-optic converters.

6. An optical communication system comprising:

an optical transmitting apparatus;

an optical receiving apparatus; and a plurality of optical transmission lines connected between said optical transmitting apparatus and said optical receiving apparatus, said optical transmitting apparatus comprising a plurality of replaceable electro-optic converters each in correspondence with one of said optical transmission lines, said optical receiving apparatus comprising a plurality of replaceable opto-electric converters each in correspondence with one of said optical transmission lines, wherein at least one of said replaceable electro-optic converters includes an N-to-1 parallel-to-serial converter, a size of the one of said replaceable electro-optic converters being N-times a size of another replaceable electro-optic converter including no parallel-to-serial converter, at least one of said replaceable opto-electric converters includes an 1-to-N serial-to-parallel converter, a size of the one of said replaceable opto-electric converters being N-times a size of another replaceable opto-electric converter including no serial-to-parallel converter.

7. The optical communication system as set forth in claim 6, wherein said replaceable electro-optic converters and said replaceable opto-electric converters are of a stick type.

8. The optic communication system as set forth in claim 6, being duplex.

9. The optical communication system as set forth in claim 6, further comprising:

a plurality of slots, wherein each of the plurality of replaceable electro-optic converters is connected to a respective one of the plurality of slots of the optical transmitting apparatus and the optical receiving apparatus, to allow for connection and removal of any one of the plurality of replaceable electro-optic converters without affecting any other of the plurality of replaceable electro-optic converters.

10. An optical communication system comprising:

an optical transmitting apparatus;

an optical receiving apparatus; and a plurality of optical transmission lines connected between said optical transmitting apparatus and said optical receiving apparatus, said optical transmitting apparatus comprising a plurality of replaceable electro-optic converters each in correspondence with one of said optical transmission lines, and a plurality of information adding units each in correspondence with one of said optical transmission lines, said optical receiving apparatus comprising a plurality of replaceable opto-electric converters each in correspondence with one of said optical transmission lines, and a plurality of monitoring information adding units each in correspondence with one of said optical transmission lines, wherein said plurality of replaceable electro-optic converters are housed in first units separate from second units in which said plurality of information adding units are housed, to thereby allow said replaceable electro-optic converters to be replaceably connected to and disconnected from said information adding units, and wherein said plurality of replaceable opto-electric converters are housed in third units separate from fourth units in which said plurality of monitoring information adding units are housed, to thereby allow said replaceable opto-electric converters to be replaceably connected to and disconnected from said monitoring information adding units.

11. The optical communication system as set forth in claim 10, further comprising:

a plurality of slots, wherein each of the plurality of replaceable electro-optic converters is connected to a respective one of the plurality of slots of the optical transmitting apparatus and the optical receiving apparatus, to allow for connection and removal of any one of the plurality of replaceable electro-optic converters without affecting any other of the plurality of replaceable electro-optic converters.

* * * * *